United States Patent [19]

Ache

[11] Patent Number: 4,615,219

[45] Date of Patent: Oct. 7, 1986

[54] PRESSURE GAUGE FOR USE WITH A CORROSIVE FLUID MEDIUM

[75] Inventor: Lani G. Ache, Allentown, Pa.

[73] Assignee: Ametek, Inc., Sellersville, Pa.

[21] Appl. No.: 765,058

[22] Filed: Aug. 12, 1985

[51] Int. Cl.[4] .................................................. G01L 7/04
[52] U.S. Cl. .......................................... 73/741; 92/90
[58] Field of Search .......... 73/741, 742, 743, 732–740; 92/90, 91

[56] References Cited

U.S. PATENT DOCUMENTS

| 18,129 | 9/1857 | Ashcroft | 73/741 |
| 647,164 | 4/1900 | Staaf | 73/740 |
| 2,712,240 | 7/1955 | Booth | 73/741 |
| 3,975,967 | 8/1976 | Conti | 73/732 |
| 4,191,056 | 3/1980 | Holden | 73/743 |

Primary Examiner—Donald O. Woodiel

[57] ABSTRACT

A pressure gauge for use with a corrosive fluid containing a sulfide which includes a Bourdon tube made from stainless steel type 316 and having a first or outer hardened layer and a second or inner layer having a hardness equal to or less than Rc22. The Bourdon tube is welded to a socket and to a closure member using stainless steel type 316 such that the weld seals the interface between the first and second layers to isolate the hardened outer layer from the corrosive fluid.

3 Claims, 3 Drawing Figures

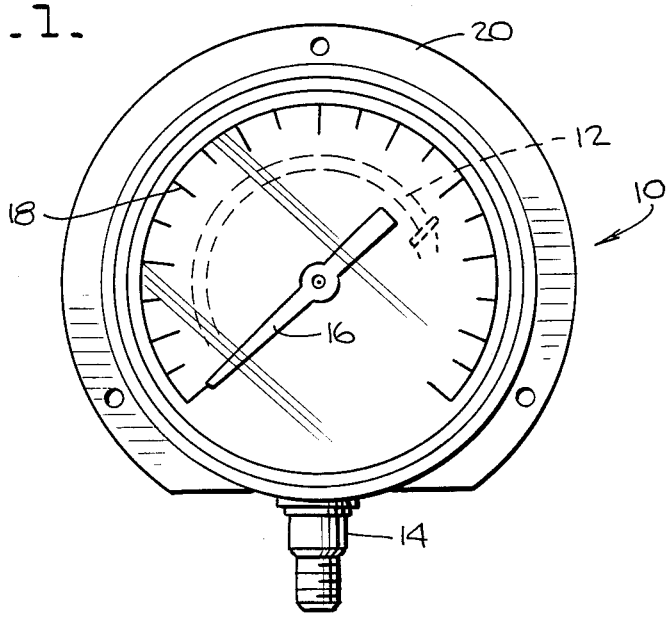
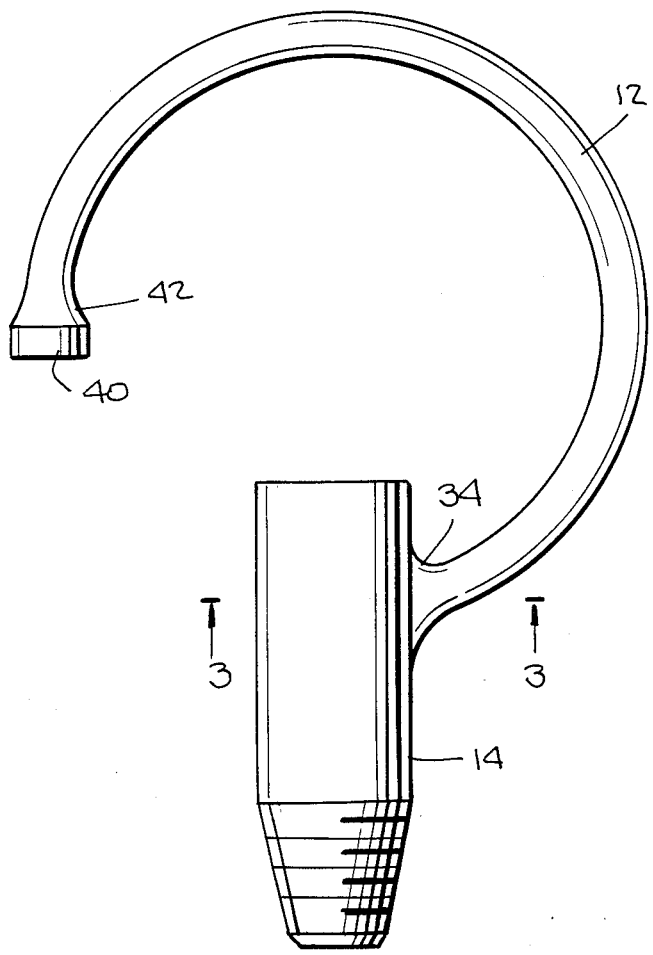
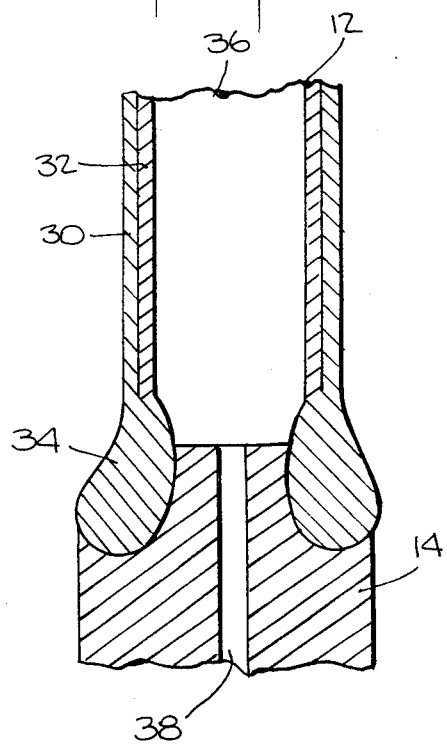

PRESSURE GAUGE FOR USE WITH A CORROSIVE FLUID MEDIUM

This invention relates to pressure gauges and, in particular, to pressure gauges which resist stress-corrosion cracking.

Stress-corrosion cracking refers to metal fracture due to the combined action of tensil stresses and specific corrosive mediums which initiate and propagate fracture through metal parts. Application of tensile stresses well below the design yield strength of a metal when combined with exposure to even relatively mild chemically corrosive mediums can result in metal failure due to stress-corrosion cracking. One field where this phenomenon is well documented is in the oil industry which is plagued by stress-corrosion cracking caused by contact of metals with crude oils or gases containing a fulfide as the corrosion inducing chemical. Such stress-corrosion cracking affects Bourdon tube pressure gauges which are used in the oil industry to measure the pressure of crude oils or gases containing a sulfide.

In general, the approach to solving the problems associated with stress-corrosion cracking have concentrated in three areas: alloy selection, stress limits and service environmental controls. Although alloy selection may be the easiest, it is sometimes economically impractical. While it is known that high nickel alloys such as Monels, Inconel and Hastelloys resist sulfide stress-corrosion cracking at highly stressed levels, these alloys are very expensive and cannot be used for such things as pipelines and drill casings. Controlling the service environment is not practical, is costly and can be ineffective due to the difficulty in measuring the corrosive medium.

The most widely accepted method for controlling stress-corrosion cracking is to impose stress limits on the materials used in the corrosive environment. Many industries have studied the susceptibility of various materials to stress-corrosion cracking. The oil industry, in particular, has studied stress-corrosion cracking caused by sulfides in relation to the internal stresses developed in various materials as measured by a simple hardness test. This industry investigation had lead to the development of national standards published by the National Association of Corrosion Engineers (NACE) entitled "Sulfide Stress-Cracking Resistant Metallic Material For Oilfield Equipment, NACE MR-01-75" which specifies the maximum hardness which various materials can have when exposed to a sulfide environment in order to minimize stess-corrosion cracking. For example, nickel-copper alloys, such as Monels, can have a hardness level of Rc35, while austentitic stainless steels, such as, SS Type 316, are limited to a hardness of Rc22. (The standard abbreviation Rc refers to Rockwell hardness number, C scale.)

Presently, pressure gauges used in sulfide environments have Bourdon tubes formed of Monel or highly stressed cold-drawn stainless steel with a hardness of Rc35-37. Monel is relatively expensive when compared to stainless steel. However, the high stresses in the Bourdon tube made from cold-drawn stainless steel makes that material a target for sulfide stress-corrosion cracking. Using a lower hardness material, such as austentitical stainless steel would not provide a material with satisfactory spring properties required for proper operation of a Bourdon tube.

Stainless steel type 316 has also been used to form Bourdon tubes for pressure gauges. This material has a high chromium content and is resistant to corrosion. However, the maximum hardness which this material can have in a sulfide environment is Rc22, well below the hardness required for proper function of a Bourdon tube. However, it would be desirable to manufacture a Bourdon tube from stainless steel type 316 for use in a sulfide environment because of its relatively low cost. Further, it would be desirable to use stainless steel type 316 on all components which are in direct contact with the Bourdon tube since the use of a homogeneous material would eliminate the problems of galvanic corrosion associated with the coupling of dissimilar materials.

It is an object of the invention to overcome the problems associated with stress-corrosion cracking of metals and, in particular, to provide a pressure gauge which can be used to measure the pressure of oils and gases containing sulfides.

It is a more specific object of the invention to provide a pressure gauge in which only relatively low stressed material is in contact with a corrosive medium to reduce the susceptibility of the Bourdon tube to stress-corrosion cracking.

It is a more specific object of the invention to provide a Bourdon tube made from stainless steel type 316 which is resistant to stress-corrosion cracking and can provide accurate measurements of the pressure of a fluid containing a corrosive sulfide.

More specifically, in accordance with the invention, there is provided a stress-corrosion cracking resistant pressure gauge which senses the pressure of a fluid containing a chemically corrosive component, such as a sulfide, which comprises a Bourdon tube having first and second ends and a first layer of hardened stainless steel type 316 and a second inner layer formed of stainless steel type 316 having a hardness equal to or less than Rc22 with the second layer forming a fluid passageway for receiving the fluid. A socket is formed of stainless steel type 316 also having a fluid passageway and the first end of the Bourdon tube is joined to the socket by a weld formed from stainless steel type 316 such that the fluid passageway in the Bourdon tube communicates with the fluid passageway in the socket. A closure also formed of stainless steel type 316 closes the second end of the Bourdon tube and is welded in place using stainless steel type 316. The welds seal the interface between the first and second layers of the Bourdon tube to isolate the stress hardened outer layer from the corrosive fluid. This construction results in a pressure gauge made of a homogeneous material in which the material in contact with the corrosive medium has the lowest possible stresses.

While laminated Bourdon tubes for pressure gauges have been described, for example, in U.S. Pat. Nos. 18,129; 647,164; 2,712,240; 3,603,153 and 3,732,733, none of those prior patents addresses the problems of stress-corrosion cracking of materials. U.S. Pat. No. 18,129 does not address the problem of sealing the layers to prevent the corrosive medium from contacting the outer layer of the Bourdon tube. U.S. Pat. No. 647,164 uses a plug to effect an end seal and is brazed into position. Brazing is a low temperature operation formed with zinc, lead or silver alloys. These alloys are low strength, have low corrosion resistance and have low service termperatures. The pressure gauge constructed in accordance with applicant's invention uses stainless steel type 316 filler material to weld the Bourdon tube to the socket and the closure member to the Bourdon tube to form the pressure sensing portion of the pressure gauge out of a homogeneous material and insure that only relatively soft material is in contact with the corrosive environment to reduce or eliminate stress-corrosion cracking.

These and other features, objects and advantages of the invention will be better understood by reference to the following detailed description of the invention when taken in conjunction with the drawings, in which:

FIG. 1 is a front elevational view, partially broken away, of a pressure gauge using a Bourdon tube constructed in accordance with the invention;

FIG. 2 is a front elevational view of the Bourdon tube, socket and closure member; and FIG. 3 is a sectional view which is fragmented and enlarged taken along line 3—3 of FIG. 2 and looking in the direction of the arrows.

Referring to FIG. 1, pressure gauge 10 includes a Bourdon tube 12 having one end fixed to socket 14 and a free end coupled to pointer 16 which moves relative to the face of dial 18. A generally annularly shaped casing 20 forms the instrument housing and supports the elements of pressure gauge 10 as is generally understood in the art. Fluid entering socket 14, as indicated by arrow 22, flows into a central passageway (not shown in FIG. 1) formed in Bourdon tube 12 causing the free end therefore to move by an amount dependent upon the fluid pressure. Movement of the free end of Bourdon tube 12 causes the pointer 16 to move relative to the face of dial 18 to indicate the pressure of the fluid.

It will be appreciated that the fluid entering Bourdon tube 12 directly contacts the inner surfaces of Bourdon tube 12. Since Bourdon tube 12 is highly stressed, there is a danger that the material forming Bourdon tube 12 could fail due to stress-corrosion cracking if the fluid contains a corrosive element such as a sulfide. Heretofore, to attempt to overcome this problem, Bourdon tubes have been made from Monels which are relatively expensive materials.

Referring to FIGS. 2 and 3, problems of using Bourdon tubes in corrosive environments are solved in accordance with the invention by Bourdon tube 12 which includes a first or outer layer 30 forming the control lamelle of Bourdon tube 12 and made from stainless steel type 316 having a hardness in the range of Rc35 to Rc37. Bourdon tube 12 also includes a second or inner layer 32 made from stainless steel type 316 with a hardness equal to or less than Rc22. Bourdon tube 12 is fixed to stainless steel socket 14 by weld 34 using stainless steel type 316 as the filler material with fluid passageway 36 in Bourdon tube 12 communicating with fluid passageway 38 in socket 14. The free end of Bourdon tube 12 is closed by closure member 40 made from hardened stainless steel type 316 having the same hardness as socket 14 and welded in place using stainless steel type 316 as a filler material, as indicated by reference numeral 42.

As best seen in FIG. 3, welds 34 and 42 pressure seal the socket and tip ends of both layers 30 and 32 of Bourdon tube 12 and seal the interface between layers 30 and 32. These welds prevent the intrusion of corrosive fluids, which enter the fluid passageway 36 of Bourdon tube 12 from fluid passageway 38 of socket 14 from entering into the interface between layers 30 and 32 and guarantees that the hardened outer layer 30 is isolated from the corrosive fluid. The welding process melts layers 30 and 32, socket 14 or closure member 40 in the area of the weld, as well as the stainless steel type 316 filler material used to form the weld. When solidified, the weld material has a soft cast metallographic structure. During welding, the welding parameters and techniques are applied to prevent build-up of welding induced stresses, as is well known in the art. The completed welded unit is given a postwelding stress-relief heat treatment to insure minimum stresses in the welded area. This construction results in a pressure gauge having a homogeneous material with the lowest possible stresses present in those portions of the Bourdon tube in contact with the corrosive fluid, therefore reducing the effect of stress-corrosion cracking.

While the invention has been described with reference to the presently preferred embodiment, modifications can be made to the invention without departing from the spirit and scope thereof, the invention being set forth in the claims.

What I claim is:

1. A stress-corrosion, cracking resistant pressure gauge for sensing the pressure of a fluid, including sulfide as a component thereof, comprising:
   a Bourdon tube having a first and second end and a passageway for receiving fluid including a first layer formed from hardened stainless steel type 316;
   a second layer interior to said first layer and formed of stainless steel type 316 having a hardness equal to or less than Rc22, said second layer forming said fluid passageway in said Bourdon tube;
   a socket formed of stainless steel type 316 and having a fluid passageway formed therein, the first end of said Bourdon tube being joined to said socket by a weld formed from stainless steel type 316 which bonds the ends of first and second layers;
   closure means formed of stainless steel type 316 for closing the second end of said Bourdon tube and joined to said second end by a weld formed from stainless steel type 316 which bonds the ends of the first and second layers;
   said welds sealing the interface between said first and second layers to prevent contact of fluid with the first layer of the Bourdon tube; and
   means coupled to said Bourdon tube for providing a visual indication of the pressure of said fluid.

2. The pressure gauge of claim 1 wherein the hardness of said first layer is in the range of Rc33 to Rc35.

3. A Bourdon tube for use in a stress-corrosion, cracking resistant pressure gauge for sensing the pressure of a fluid, including sulfide as a component thereof, comprising:
   a first layer formed from hardened stainless steel type 316;
   a second layer interior to said first layer and formed of stainless steel type 316 having a hardness equal to or less than Rc22, said second layer forming a fluid passageway in said Bourdon tube;
   a socket formed of stainless steel type 316 and having a fluid passageway formed therein, a first end of said Bourdon tube being joined to said socket by a weld formed from stainless steel type 316 which bonds the ends of first and second layers; and
   closure means formed of stainless steel type 316 for closing a second end of said Bourdon tube and joined to said second end by a weld formed from stainless steel type 316 which bonds the ends of the first and second layers, said welds sealing the interface between said first and second layers to prevent contact of the fluid with the first layer of the Bourdon tube.

* * * * *